No. 803,840. PATENTED NOV. 7, 1905.
D. MILLER.
COUPLING DEVICE.
APPLICATION FILED SEPT. 14, 1903.

Witnesses.
Harry N. Tilden
Helen Orford

Inventor.
David Miller.
by Albert H. Davis
Atty

UNITED STATES PATENT OFFICE.

DAVID MILLER, OF SCHENECTADY, NEW YORK, ASSIGNOR TO GENERAL ELECTRIC COMPANY, A CORPORATION OF NEW YORK.

COUPLING DEVICE.

No. 803,840.   Specification of Letters Patent.   Patented Nov. 7, 1905.

Application filed September 14, 1903. Serial No. 173,048.

*To all whom it may concern:*

Be it known that I, DAVID MILLER, a citizen of the United States, residing at Schenectady, in the county of Schenectady, State of New York, have invented certain new and useful Improvements in Coupling Devices, of which the following is a specification.

This invention relates to means for quickly coupling and uncoupling two separable elements. It has been designed especially to couple the vibrator of a pattern-vibrating machine with the pattern, whereby the latter is loosened and removed from the mold; but it is capable of many other uses, and hence I do not limit myself to such an application of it.

The invention consists in the combination, with a bifurcated member, of a second member having a transverse rotatable pin adapted to enter between the jaws of the first member and so constructed that it can be locked therein by a partial rotation.

Figure 1:
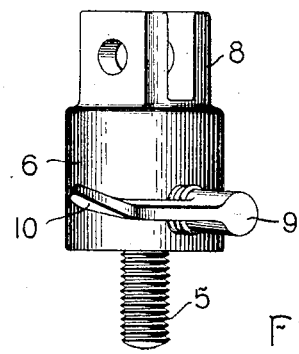
Figure 2:
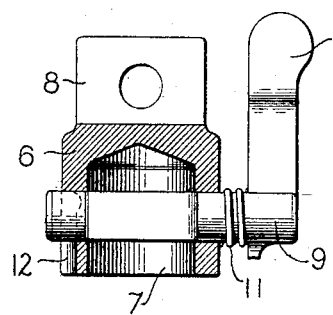
Figure 3:
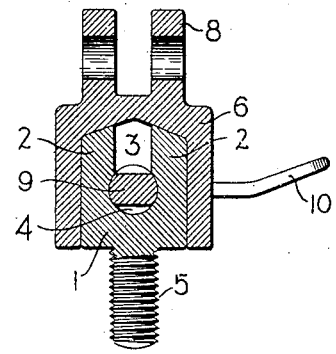
Figure 4:
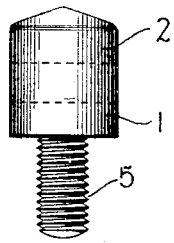
Figure 5:
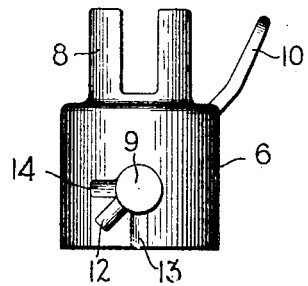

In the accompanying drawings, Figure 1 is a side elevation of my improved coupling. Fig. 2 is a sectional elevation of the pin-carrying member. Fig. 3 is a longitudinal section. Fig. 4 is a side elevation of the bifurcated member, and Fig. 5 is a side elevation of the pin-carrying member.

The coupling is composed of two separable members, one of which has a body 1, provided with two parallel jaws 2, formed by a transverse longitudinal slot 3, terminating in a cylindrical enlarged end 4. The body is provided with means for attaching it to any desired object, such means being preferably a screw-threaded shank 5. The second member of the coupling has a body 6, provided with a socket 7, adapted to fit snugly over the slotted member 1. A slotted shank 8 affords provision for attaching this member to any desired object. Spanning the socket 7 is a cylindrical pin 9, rotatable in bearings in the walls of said socket and projecting beyond them at each end. That portion of the pin inside the socket 7 is flattened on opposite sides, the width between the flattened faces being slightly less than that of the slot 3. The diameter between the cylindrical faces of the pin is substantially the same as that of the enlargement 4. On one end of the pin is a handle 10, and abutting between the handle and the socket 7 is a helical spring 11. The other end of the pin has a laterally-projecting lug 12, which is pulled against the adjacent wall of the socket by the spring and is adapted to enter two notches 13 14, one lengthwise of the body 6 and the other at right angles thereto.

The operation of the device is as follows: To unite the two members of the coupling, the pin is turned so that its flattened portion can pass between the jaws 2 when the latter are slipped into the socket 7. When the pin reaches the enlargement 4, it can be given a quarter-rotation by the handle, which will lock it in place, as shown in Fig. 3, and fasten the two members together. In this position of the pin the lug 12 will be snapped into the notch 14 by the spring, so as to prevent accidental turning of the pin and consequent uncoupling of the members. When it is desired to separate them, the pin can be pushed lengthwise until the lug is disengaged from the notch and can then be rotated a quarter-turn to bring the pin into position to slip out through the slot 3, in which position it is held by the lug entering the notch 13.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. A coupling comprising two members, one having a longitudinal slot provided with an enlarged cylindrical end, and the other having a socket to fit over the slotted member, and a rotatable cylindrical pin transverse to said socket, flattened to pass through said slot, and rotatable in said enlarged end.

2. A coupling comprising two members, one having a longitudinal slot provided with an enlarged end, a transverse pin carried by the other member and flattened to pass through said slot, and rotatable to engage with said enlarged end, interlocking portions on the pin and the member which carries it, and a spring for causing said portions to interlock.

3. A coupling comprising two members, one having a longitudinal slot provided with an enlarged end, a transverse pin carried by the other member and flattened to pass through said slot, and rotatable to engage with said enlarged end, a lug on the pin, a notch in the member which carries it, and a spring urging said lug into said notch when the pin has been engaged with the slotted member.

In witness whereof I have hereunto set my hand this 12th day of September, 1903.

DAVID MILLER.

Witnesses:
 BENJAMIN B. HULL,
 HELEN ORFORD.